US011154757B2

(12) United States Patent
Takeuchi

(10) Patent No.: US 11,154,757 B2
(45) Date of Patent: Oct. 26, 2021

(54) GRIP FOR GOLF CLUB

(71) Applicant: SUMITOMO RUBBER INDUSTRIES, LTD., Hyogo (JP)

(72) Inventor: Hiroyuki Takeuchi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/845,543

(22) Filed: Apr. 10, 2020

(65) Prior Publication Data

US 2020/0338412 A1 Oct. 29, 2020

(30) Foreign Application Priority Data

Apr. 26, 2019 (JP) .............. JP2019-086856

(51) Int. Cl.
| | | |
|---|---|---|
| *A63B 53/14* | (2015.01) | |
| *A63B 60/16* | (2015.01) | |
| *A63B 60/14* | (2015.01) | |
| *B29C 43/02* | (2006.01) | |
| *B29C 43/36* | (2006.01) | |

(Continued)

(52) U.S. Cl.
CPC .............. *A63B 53/14* (2013.01); *A63B 60/14* (2015.10); *A63B 60/16* (2015.10); *B29C 43/021* (2013.01); *B29C 43/36* (2013.01); *A63B 53/047* (2013.01); *A63B 53/0466* (2013.01); *A63B 53/0487* (2013.01); *A63B 60/54* (2015.10);

(Continued)

(58) Field of Classification Search
CPC ......... A63B 60/06; A63B 60/08; A63B 60/14; A63B 60/16; A63B 53/14; A63B 60/02; A63B 53/0466; A63B 53/047; A63B 53/0487; A63B 2209/02; A63B 60/54; A63B 60/24; A63B 60/10; A63B 2071/0694; A63B 60/50; A63B 2209/00; B29C 43/021; B29C 43/36; B29C 2043/3665; B29L 2031/5227

See application file for complete search history.

(56) References Cited

U.S. PATENT DOCUMENTS 2,604,661 A * 7/1952 Karns .................. B29C 33/123
425/116
3,837,647 A * 9/1974 Jacques ................. A63B 53/14
473/300

(Continued)

FOREIGN PATENT DOCUMENTS

| | | | |
|---|---|---|---|
| JP | 2007029701 A | * | 1/2000 |
| JP | 2007136067 A | * | 1/2000 |

(Continued)

*Primary Examiner* — Stephen L Blau
(74) *Attorney, Agent, or Firm* — Greenblum & Bernstein, P.L.C.

(57) ABSTRACT

A grip for a golf club includes a cylindrical portion into which a shaft is inserted; and an end cap portion. The cylindrical portion, on its outer surface, includes a minute projection region where a plurality of minute projections each of which has a maximum width of 0.2 mm or more and 1.2 mm or less are arranged at intervals of 0.05 mm or more and 0.7 mm or less. The minute projection region is disposed in a first region whose distance in an axial direction from a grip butt end is from 0 mm to 210 mm. Of the grip, a portion from the grip butt end up to 50 mm therefrom has a weight of 10 g or more, and the weight accounts for 39% or more of the whole weight of the grip.

20 Claims, 8 Drawing Sheets

(51) Int. Cl.
  *A63B 53/04* (2015.01)
  *B29L 31/52* (2006.01)
  *A63B 60/54* (2015.01)
(52) U.S. Cl.
  CPC ... *A63B 2209/02* (2013.01); *B29C 2043/3665* (2013.01); *B29L 2031/5227* (2013.01)

(56) References Cited

U.S. PATENT DOCUMENTS

| | | | | |
|---|---|---|---|---|
| 4,600,195 A * | 7/1986 | Hunter | | A63B 60/24 |
| | | | | 473/297 |
| 4,674,746 A * | 6/1987 | Benoit | | A63B 60/24 |
| | | | | 30/308.1 |
| 4,887,815 A * | 12/1989 | Hughes | | A63B 53/00 |
| | | | | 473/291 |
| 5,322,290 A * | 6/1994 | Minami | | A63B 53/14 |
| | | | | 473/201 |
| 5,454,564 A * | 10/1995 | Kronogard | | A63B 53/007 |
| | | | | 473/201 |
| 5,460,372 A * | 10/1995 | Cook | | A63B 60/16 |
| | | | | 473/204 |
| 5,686,158 A * | 11/1997 | Gibbon | | A63B 60/08 |
| | | | | 428/36.92 |
| 5,749,792 A * | 5/1998 | Engfer | | A63B 60/00 |
| | | | | 473/300 |
| 5,782,705 A * | 7/1998 | Solari | | A63B 53/0487 |
| | | | | 473/300 |
| 6,372,323 B1 * | 4/2002 | Kobe | | A63B 60/10 |
| | | | | 428/119 |
| 6,743,115 B2 * | 6/2004 | Rodarte | | A63B 53/007 |
| | | | | 473/294 |
| D494,650 S * | 8/2004 | Petersen | | D21/756 |
| 6,783,463 B2 * | 8/2004 | Zichmanis | | A63B 60/10 |
| | | | | 473/204 |
| D529,971 S * | 10/2006 | Rose | | D21/756 |
| 7,326,125 B2 * | 2/2008 | Moriyama | | A63B 60/24 |
| | | | | 473/292 |
| 7,399,235 B2 * | 7/2008 | Gill | | A01K 87/08 |
| | | | | 473/297 |
| 7,637,821 B2 * | 12/2009 | Johnson | | A63B 53/007 |
| | | | | 473/202 |
| 7,798,912 B2 * | 9/2010 | Kou | | B29C 43/18 |
| | | | | 473/300 |
| 8,216,085 B2 * | 7/2012 | Fujimoto | | A63B 53/00 |
| | | | | 473/292 |
| D696,368 S * | 12/2013 | Huang | | D21/756 |
| 8,814,717 B2 * | 8/2014 | Yashiki | | A63B 53/0466 |
| | | | | 473/292 |
| 9,440,128 B2 * | 9/2016 | Huang | | B29C 59/02 |
| D860,362 S * | 9/2019 | Phillips | | D21/758 |
| 2001/0041629 A1 * | 11/2001 | Hirata | | A63B 60/14 |
| | | | | 473/316 |
| 2003/0211900 A1 * | 11/2003 | Novak | | A63B 53/14 |
| | | | | 473/300 |
| 2003/0228929 A1 * | 12/2003 | Miyasu | | A63B 53/14 |
| | | | | 473/300 |
| 2005/0026712 A1 * | 2/2005 | Byrd | | A63B 60/00 |
| | | | | 473/300 |
| 2006/0287123 A1 * | 12/2006 | Wang | | A63B 53/14 |
| | | | | 473/300 |
| 2007/0259732 A1 * | 11/2007 | Billings | | A63B 53/14 |
| | | | | 473/303 |
| 2008/0039225 A1 * | 2/2008 | Chen | | A63B 53/14 |
| | | | | 473/300 |
| 2009/0017935 A1 * | 1/2009 | Wang | | A63B 69/3632 |
| | | | | 473/300 |
| 2011/0159982 A1 * | 6/2011 | Takeuchi | | A63B 60/22 |
| | | | | 473/299 |
| 2014/0206471 A1 * | 7/2014 | Jertson | | A63B 53/14 |
| | | | | 473/300 |
| 2015/0045136 A1 * | 2/2015 | Boccieri | | A63B 53/14 |
| | | | | 473/297 |
| 2015/0251062 A1 * | 9/2015 | Kuo | | A63B 60/24 |
| | | | | 473/297 |
| 2019/0232131 A1 * | 8/2019 | Huang | | A63B 53/14 |
| 2020/0360775 A1 * | 11/2020 | Davis | | A63B 60/14 |

FOREIGN PATENT DOCUMENTS

| | | |
|---|---|---|
| JP | 2014207972 A * | 11/2014 |
| JP | 2019-659 | 1/2019 |

\* cited by examiner

GRIP FOR GOLF CLUB

This application claims priority on Patent Application No. 2019-086856 filed in JAPAN on Apr. 26, 2019. The entire contents of this Japanese Patent Application are hereby incorporated by reference.

BACKGROUND OF THE INVENTION

Field of the Invention

The present disclosure relates to a grip for a golf club.

Description of the Related Art

In a golf club, a grip is a part that a golfer grips. JP-A-2019-659 discloses a grip having a smaller dent occupation ratio in a first region P1 in the center part thereof.

SUMMARY OF THE INVENTION

It has been proven that the increased weight proportion of the butt end portion in a grip contributes to an increase in the head speed. Inconveniences in this grip, however, have also been found.

The present disclosure provides a grip that has excellent abrasion resistance and grip stability even if the butt end portion thereof has a high weight proportion.

In a grip for a golf club in one aspect, the grip includes a cylindrical portion into which a shaft is inserted; and an end cap portion. The cylindrical portion, on its outer surface, includes a minute projection region where a plurality of minute projections each of which has a maximum width of greater than or equal to 0.2 mm and less than or equal to 1.2 mm are arranged at intervals of greater than or equal to 0.05 mm and less than or equal to 0.7 mm. The minute projection region is disposed in a first region whose distance in an axial direction from a grip butt end is from 0 mm to 210 mm. The weight of a portion from the grip butt end up to 50 mm therefrom is greater than or equal to 10 g, and accounts for greater than or equal to 39% of a whole weight of the grip.

DESCRIPTION OF THE PREFERRED EMBODIMENTS

Figure 1:
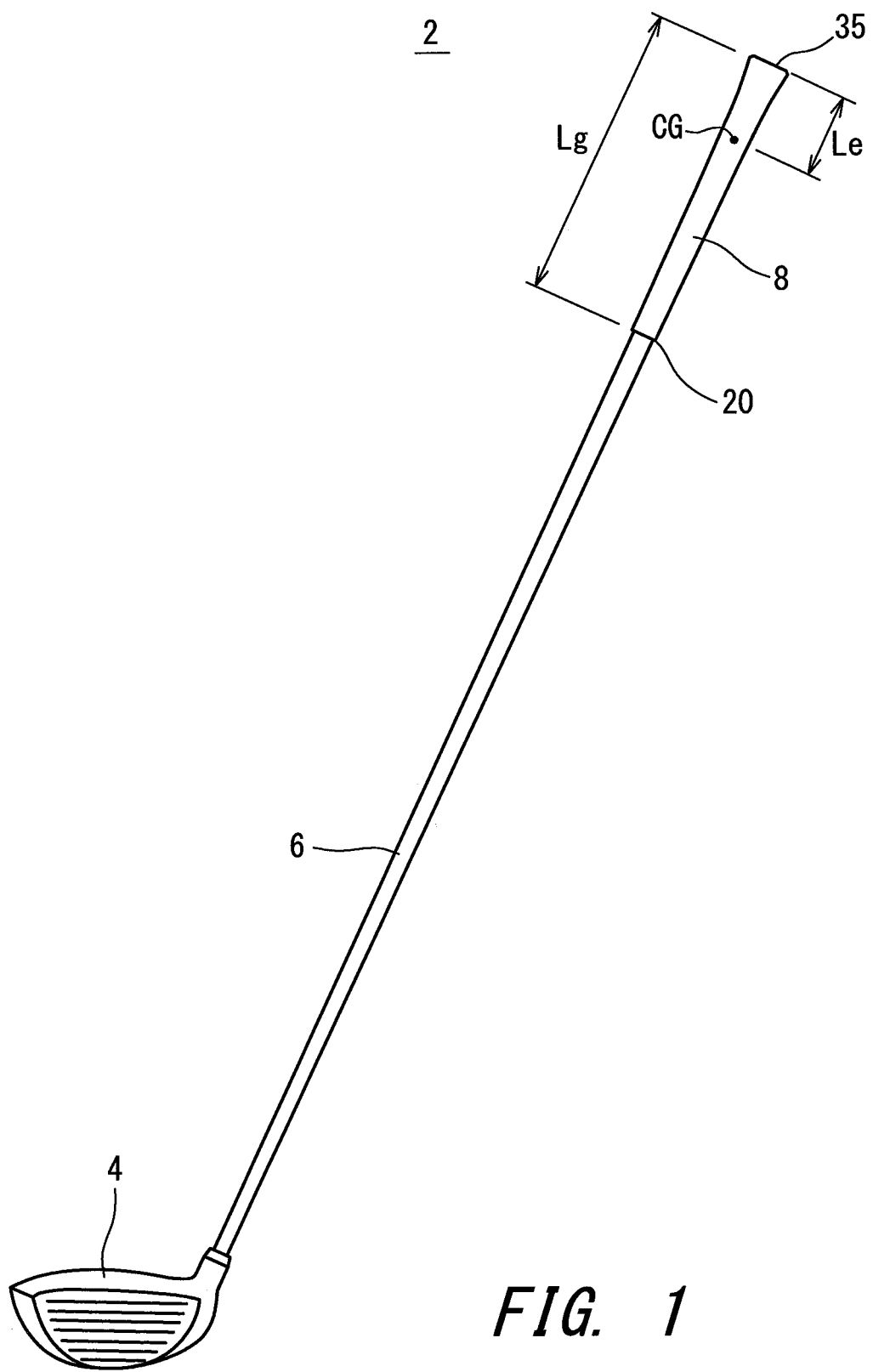
FIG. 1 shows a golf club in which a grip of a first embodiment is attached.

Detailed analysis on swings of many golfers has proved that an increase in the weight proportion of the butt end portion of a grip makes it easier to allow wrist cock to be maintained. The term "wrist cock" means the bending of the golfer's wrists during swing. Maintaining the wrist cock allows the head path to be closer to the golfer's body (rotation center), thereby causing an effective moment of inertia of the club during swing to decrease. As a result, the swing speed and the head speed are increased.

When the swing speed increases, the centrifugal force exerted to the club increases. Further, when the acceleration of the club increases, the pressing force exerted from the golfer's hands to the grip increases as well. As a result of these, the grip that is being gripped becomes wobble or nearly falls out in some cases. The grip of the present disclosure is based on such knowledge.

The following description describes embodiments in detail, while referring to the drawings appropriately.

Note that "axial direction" means the direction of the center line of a shaft inserted into a grip in the present application, unless otherwise specified. Note that "circumferential direction" means the circumferential direction of a shaft inserted into a grip in the present application, unless otherwise specified. Note that "radial direction" means the radial direction of a shaft inserted into a grip in the present application, unless otherwise specified. Although the present disclosure relates to a grip; the grip, when isolated, is deformed, and becomes well-formed when a shaft is inserted into the grip. Therefore, the axial direction, the circumferential direction, and the radial direction are determined with reference to a shaft inserted into the grip.

FIG. 1 shows an overall view of a golf club 2 in which a grip 8 according to one embodiment is attached. The golf club 2 includes a golf club head 4, a golf club shaft 6, and a grip 8 for a golf club. The head 4 is attached to a tip end portion of the shaft 6. The grip 8 is attached to a butt end portion of the shaft 6. The shaft may be light in weight; for example, may have a weight of greater than or equal to 30 g and less than or equal to 40 g.

Examples of the head 4 include a wood head, a hybrid head, an iron head, and a putter head. In the present embodiment, the head 4 is a wood head. Examples of the shaft 6 include a steel shaft and a carbon shaft. In the present embodiment, the shaft 6 is a carbon shaft. This shaft 6 is formed with a prepreg laminate.

The present embodiment is effective in a club in a high head speed design. Therefore, the present embodiment is preferably applied to clubs except for putter clubs. Further, the present application is preferably applied to a wood golf club, a hybrid golf club, and an iron golf club; more preferably, a wood golf club and a hybrid golf club; further preferably a wood golf club; and still further preferably, a driver.

Figure 2:
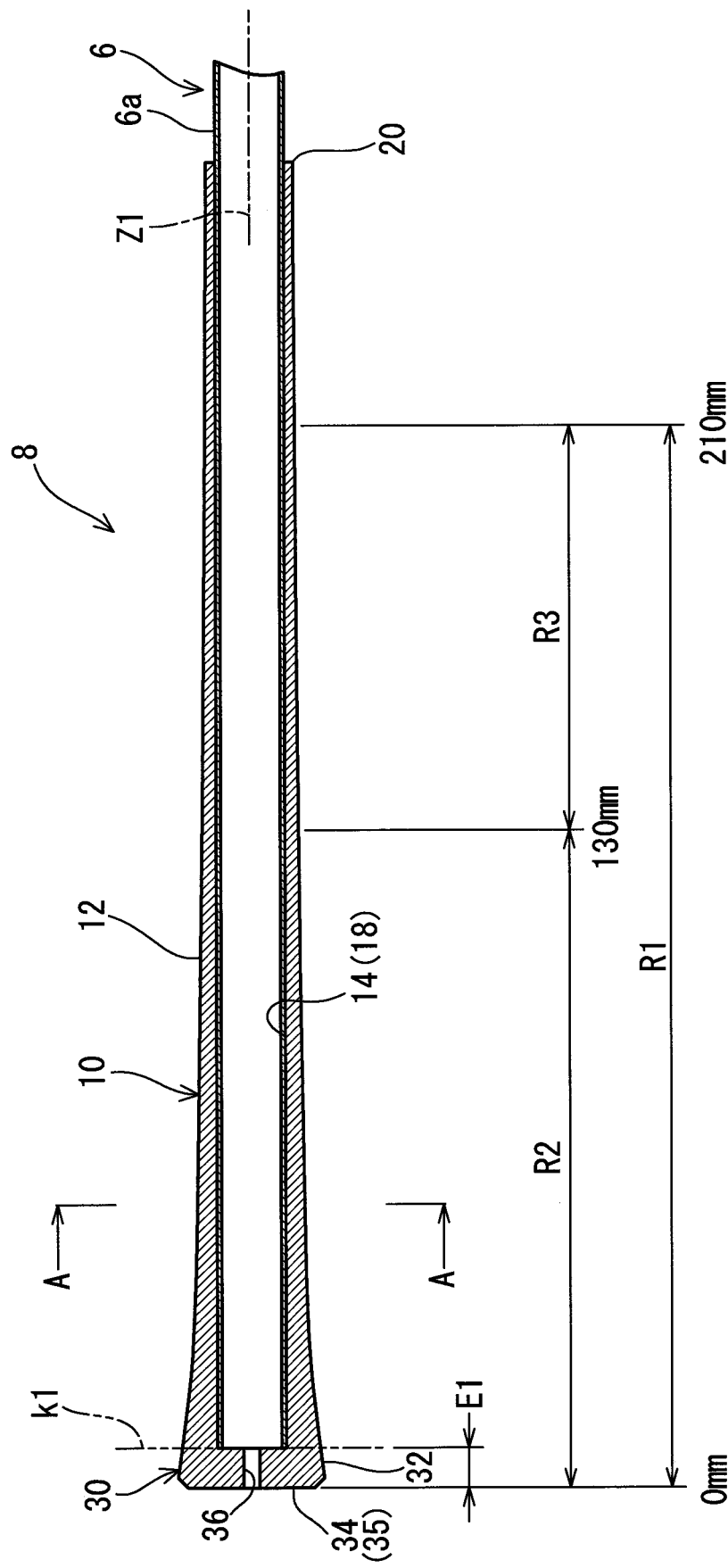
FIG. 2 is a cross-sectional view illustrating a grip-attached portion of the golf club shown in FIG. 1.

FIG. 2 is a cross-sectional view of the golf club 2, taken at a portion thereof where the grip 8 is disposed. FIG. 2 is a cross-sectional view taken along the axial direction.

The grip 8 includes a cylindrical portion 10 and an end cap portion 30.

The cylindrical portion 10 includes an outer surface 12 and an inner surface 14. The outer surface 12 forms a gripping surface that is gripped by a golfer. The inner surface 14 is bonded to an outer circumferential surface 6a of the shaft 6. Though the illustration is omitted, there is a double sided tape between the outer circumferential surface 6a of the shaft 6 and the inner surface 14. With this double sided tape, the grip 8 is fixed to the shaft 6.

Inside the cylindrical portion 10, a shaft insertion hole 18 is formed. The shaft insertion hole 18 is opened at a tip end 20 of the grip 8. The shaft 6 is inserted into the shaft insertion hole 18.

The end cap portion 30 closes the butt end of the cylindrical portion 10. The end cap portion 30 includes an end circumferential surface 32, a cap butt end surface 34, and a through hole 36. The end circumferential surface 32 forms a surface that is continuous with the outer surface 12. The cap butt end surface 34 forms a butt end surface of the grip 8. In other words, the cap butt end surface 34 constitutes the grip butt end surface. The grip butt end surface 34 includes a grip butt end 35. In the present embodiment, the grip butt end surface 34 is a flat surface, but the grip butt end surface 34 may be, for example, a convex curved surface. In this case, the vertex of the convex curved surface is the grip butt end 35. The through hole 36 penetrates through the end cap portion 30 along the axial direction. When the shaft 6 is inserted into the shaft insertion hole 18, the through hole 36 functions as an air vent.

The two-dot chain line in FIG. 2 indicates a boundary between the cylindrical portion 10 and the end cap portion 30. The boundary k1 is a plane whose position in the axial direction is positioned at a butt end of the shaft insertion hole 18. The portion on a butt side with respect to the boundary k1 is the end cap portion 30. The portion on a tip side with respect to the boundary k1 is the cylindrical portion 10. The end cap portion 30 is a portion that does not have the shaft insertion hole 18. Note that the "butt side" means the grip butt end surface 34 side, and the "tip side" means the tip end 20 side.

Figure 3:
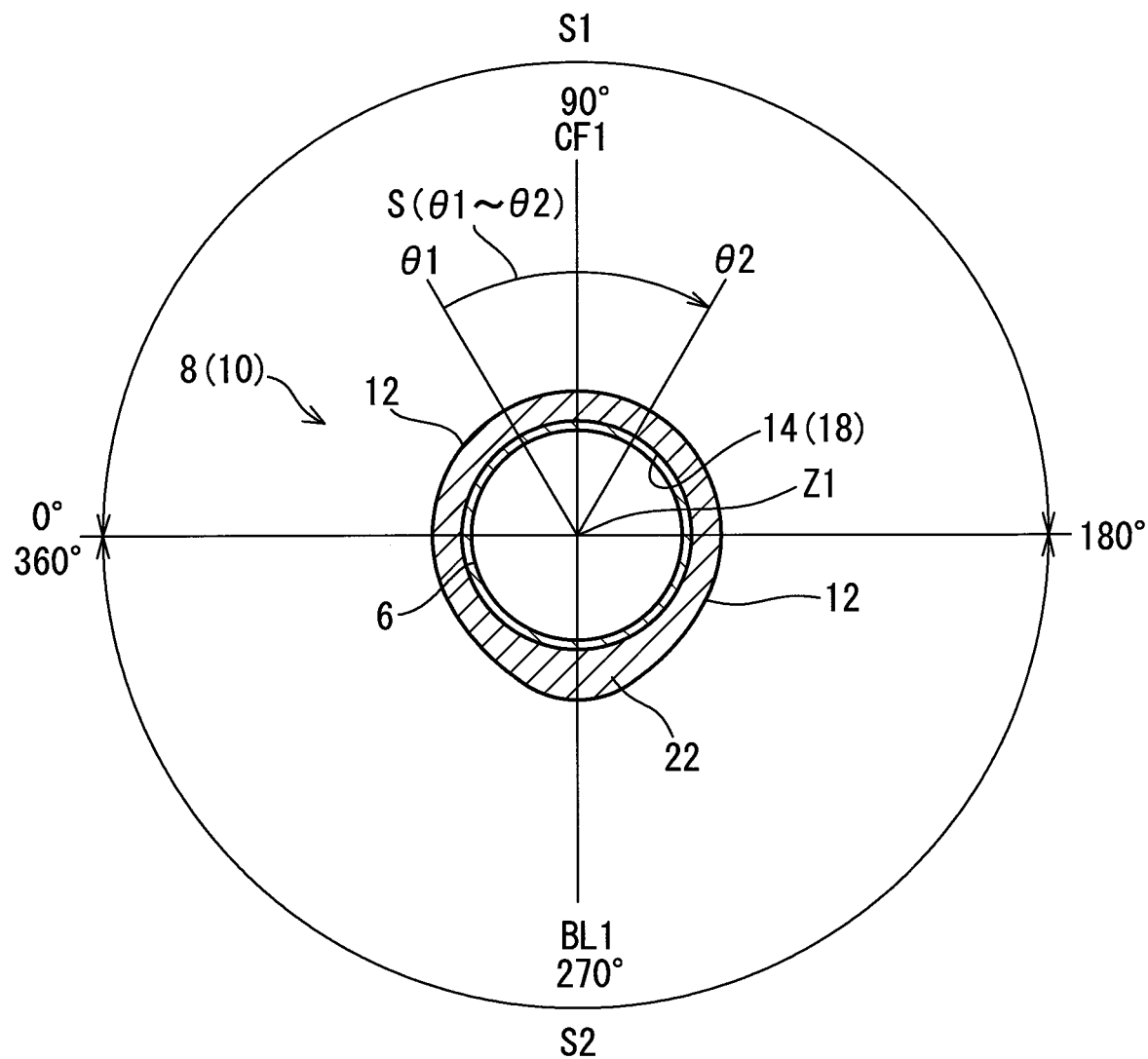
FIG. 3 is a cross-sectional view taken along line A-A shown in FIG. 2.

FIG. 3 is a cross-sectional view taken along line A-A shown in FIG. 2. FIG. 3 is a cross-sectional view taken along a plane perpendicular to the center line Z1 of the shaft 6.

The cylindrical portion 10 includes a back line 22. The back line 22 is a portion having a greater thickness at one position in the circumferential direction. As illustrated in FIG. 3, when the shaft 6 is inserted, the back line 22 becomes a projected portion. The back line 22 extends in the axial direction. The back line 22 has a length in the axial direction of preferably greater than or equal to 150 mm, and more preferably greater than or equal to 170 mm. With the length of a first region R1 described below being taken into consideration, the back line 22 preferably has a length in the axial direction of less than or equal to 250 mm. In the axial direction, the back line 22 is provided preferably in 80% or more of the first region R1, and more preferably in 90% or more of the same. The back line 22 may be provided in 100% of the first region R1. The existence of the back line 22 causes the grip 8 to have a non-circular cross section when the shaft 6 is inserted therein, the shape of the cross section being approximately an elliptical shape. Note that the cylindrical portion 10 does not necessarily have to include the back line 22.

In the present application, "first region", "second region", "third region", "front side", and "back side" are defined as follows.

The first region is a region defined in the axial direction. As shown in FIG. 2, the first region R1 is a region that extends from a position that is 210 mm away from the grip butt end 35 in the axial direction, to the grip butt end 35. In other words, the first region R1 is a region whose distance in the axial direction from the grip butt end 35 is from 0 mm to 210 mm.

The second region is a region defined in the axial direction. As shown in FIG. 2, the second region R2 is a region that extends from a position that is 130 mm away from the grip butt end 35 in the axial direction, to the grip butt end 35. In other words, the second region R2 is a region whose distance in the axial direction from the grip butt end 35 is from 0 mm to 130 mm.

The third region is a region defined in the axial direction. As shown in FIG. 2, the third region R3 is a region that extends from a position that is 210 mm away from the grip butt end 35 in the axial direction, to a position that is 130 mm away from the grip butt end 35 in the axial direction. In other words, the third region R3 is a region whose distance in the axial direction from the grip butt end 35 is from 130 mm to 210 mm.

The "front side" is a region defined in the circumferential direction. As shown in FIG. 3, the existence of the back line 22 determines a position in the circumferential direction (circumferential position) at which the grip thickness is maximum. This circumferential position is referred to as "back line position BL1". In a case where the portion where the grip has the maximum thickness has a certain width in the circumferential direction, the position at the center of this width is considered to be the "back line position BL1".

In the present application, a circumferential position when the cross section of the grip 8 is viewed from the butt side is specified by an angle. As shown in FIG. 3, the circumferential position of the back line position BL1 is set to 270°. A position 180° away from the back line position BL1 in the circumferential direction is given as a "front reference position CF1". The circumferential position of the front reference position CF1 is set to 90°. In other words, the circumferential position of the front of the grip 8 is set to 90°. A position 90° away in the counterclockwise direction from the front reference position CF1 is given as 0°. A position 90° away in the clockwise direction from the front reference position CF1 is given as 180°. In this way, a circumferential position when the cross section of the grip 8 is viewed from the butt side is specified by a clockwise angle in a range of 0° to 360°.

The "front side S1" is defined as a region from the circumferential position of 0° to the circumferential position of 180°. The position at the center of the front side S1 in the circumferential direction is the front reference position CF1. The "back side S2" is defined as a region from the circumferential position of 180° to the circumferential position of 360°. The position at the center of the back side S2 in the circumferential direction is the back line position BL1.

To simplify descriptions, a region S from a circumferential position of θ1° to a circumferential position of θ2° is also described as a "circumferential range (θ1° to θ2°)" in the present application. Therefore, for example, the front side S1 is a circumferential range (0° to 180°).

Figure 4:
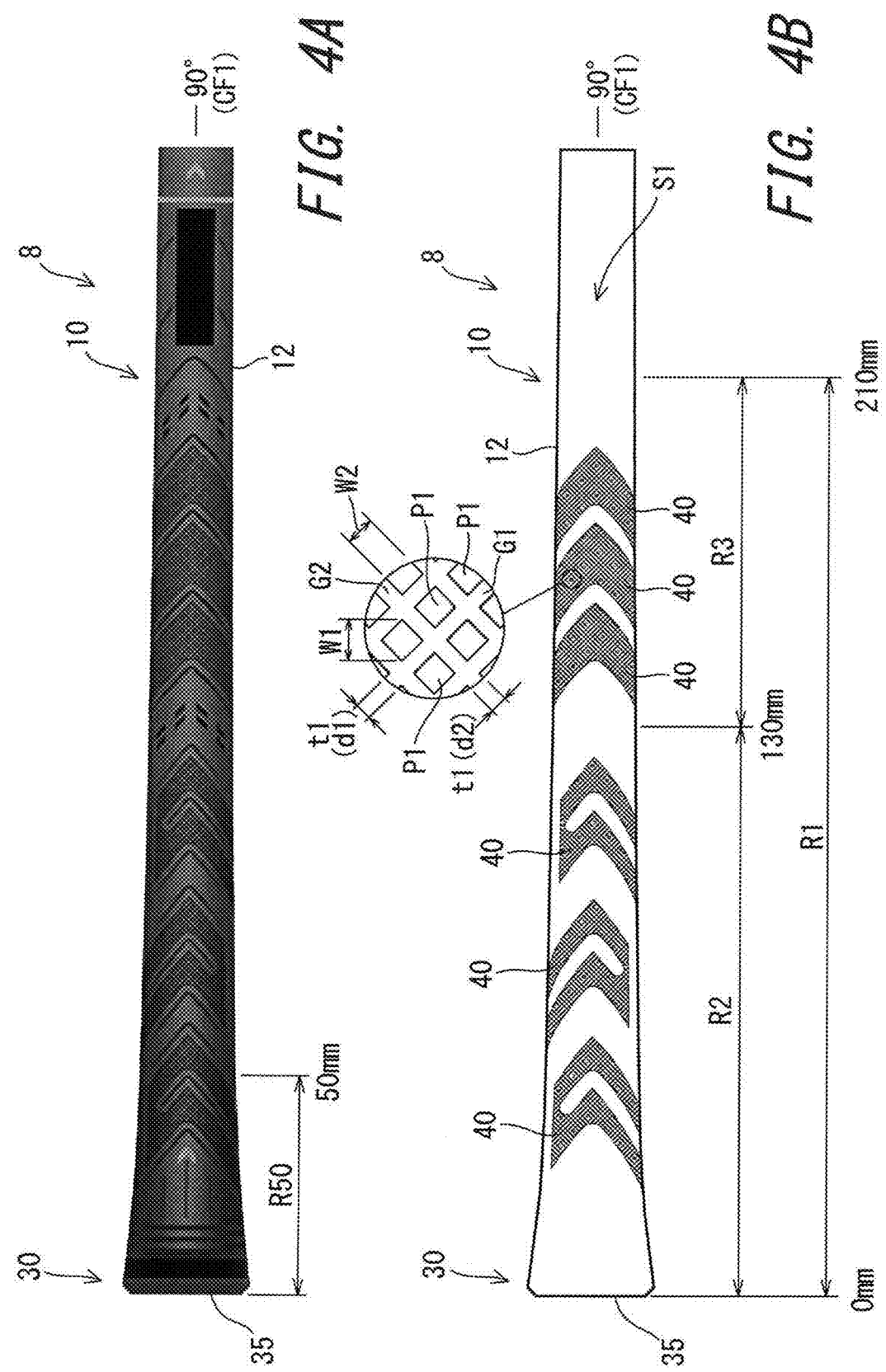
FIG. 4A is a front view of the grip when it is viewed from the front (in the direction of 90°)
FIG. 4B is a front view showing only minute projection regions extracted from the view in FIG. 4A.
Figure 5:
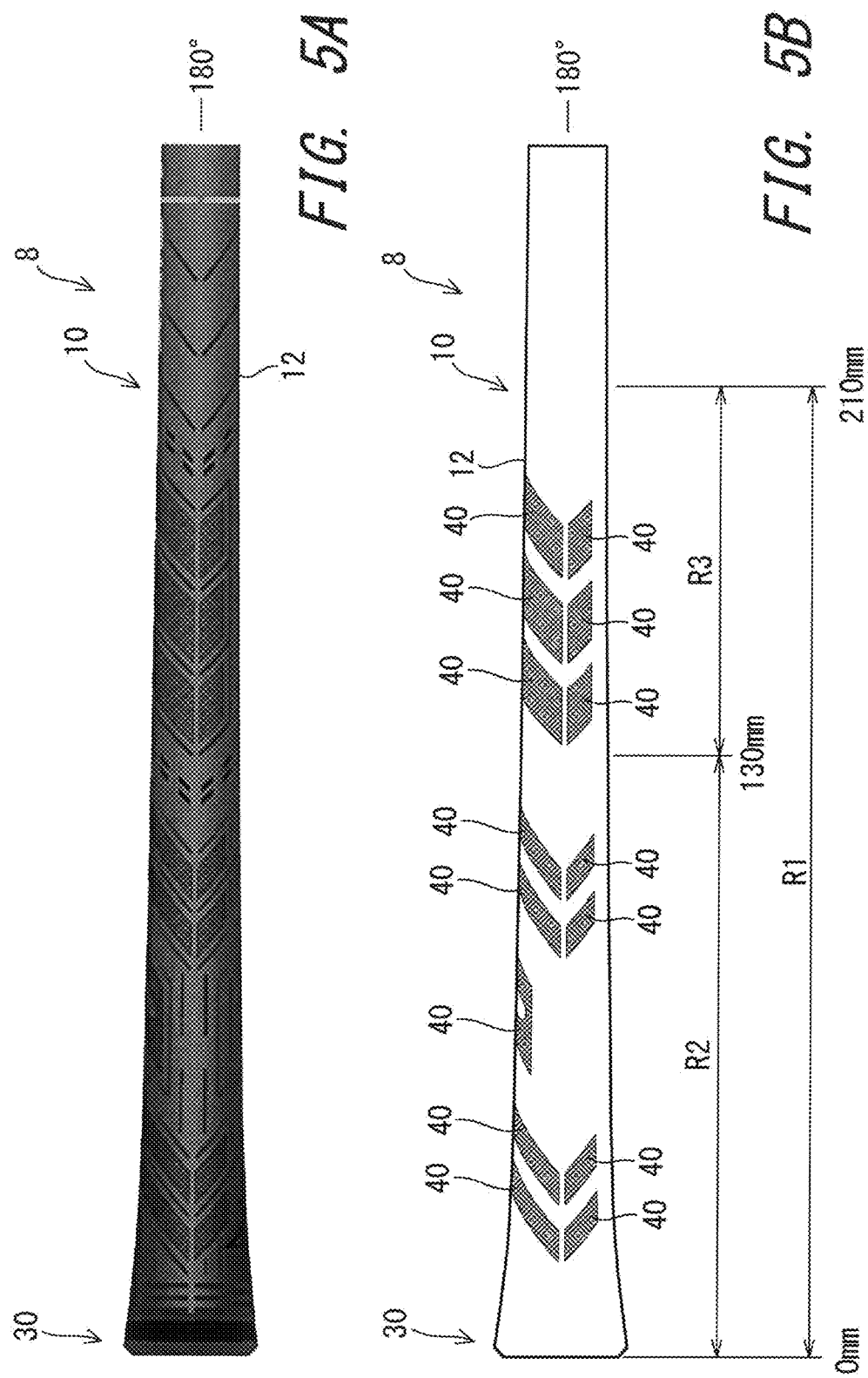
FIG. 5A is a right side view of the grip when it is viewed from the right side (in the direction of 180°)
FIG. 5B is a right side view showing only minute projection regions extracted from the view in FIG. 5A.
Figure 6:
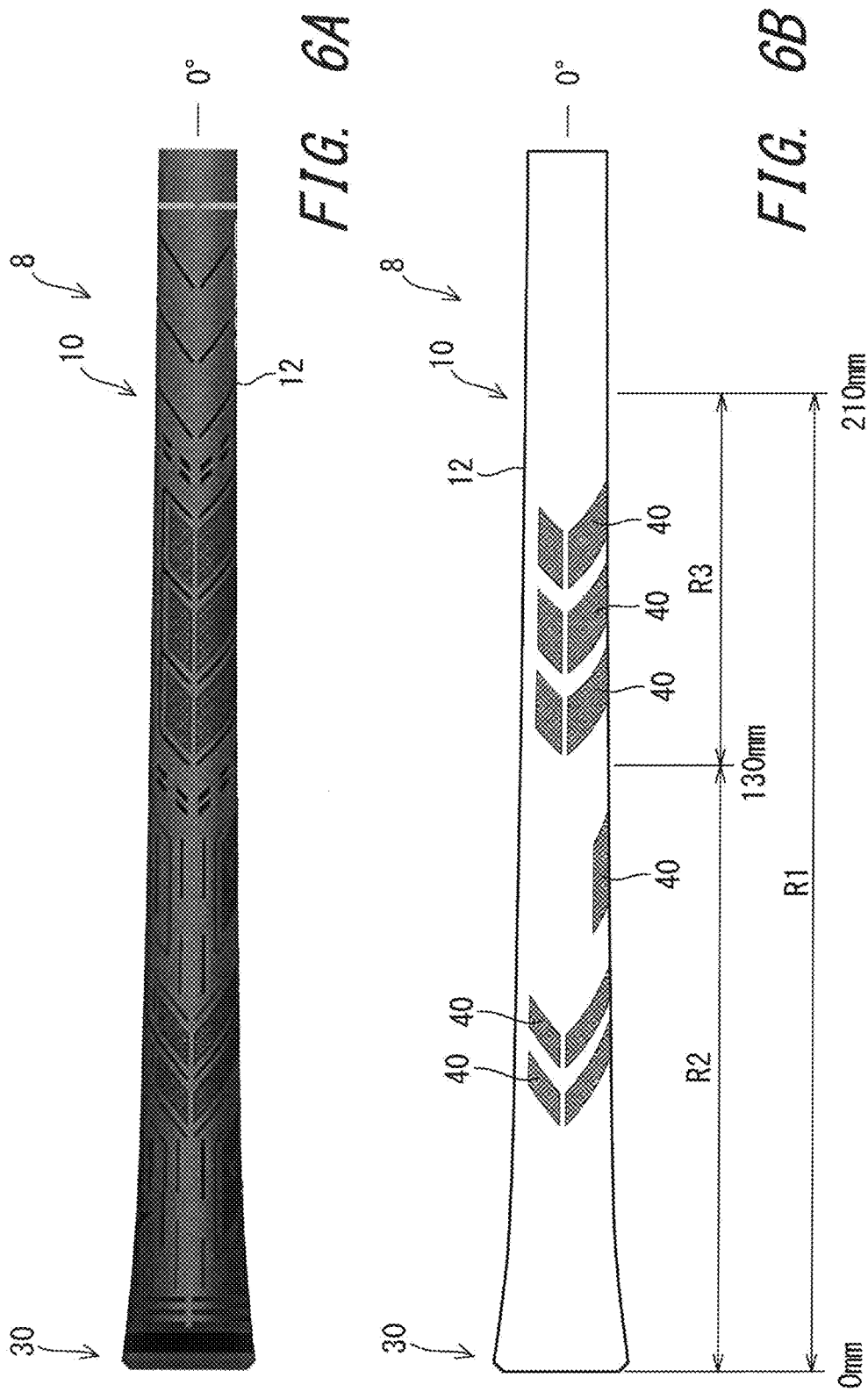
FIG. 6A is a left side view of the grip when it is viewed from the left side (in the direction of 0°)
FIG. 6B is a left side view showing only minute projection regions extracted from the view in FIG. 6A.
Figure 7:
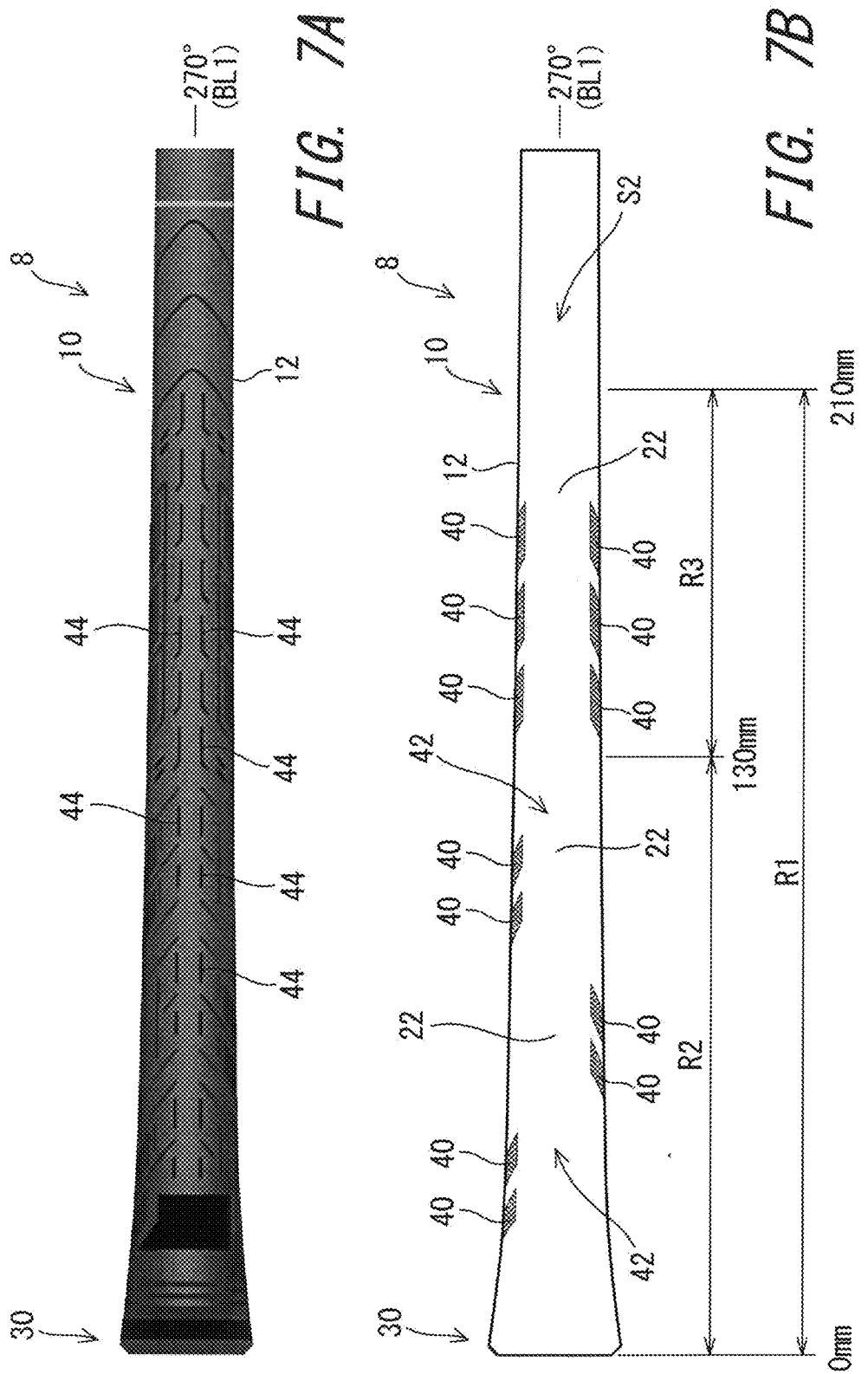
FIG. 7A is a back view of the grip when it is viewed from the back side (in the direction of 270°)
FIG. 7B is a back view showing only minute projection regions extracted from the view in FIG. 7A; and, FIG. 8 is a cross-sectional view showing a state of a grip of a second embodiment when a shaft is inserted into the grip.

FIG. 4A is a front view of the grip 8 when it is viewed from the front reference position CF1 (from the direction of 90°), and FIG. 4B shows minute projection regions extracted from the view in FIG. 4A. FIG. 5A is a right side view of the grip 8 when it is viewed from the direction of 180°, and FIG. 5B shows minute projection regions extracted from the view in FIG. 5A. FIG. 6A is a left side view of the grip 8 when it is viewed from the direction of 0°, and FIG. 6B shows minute projection regions extracted from the view in FIG. 6A. Note that the front reference position CF1 is positioned on the lower side in FIGS. 6A and 6B. FIG. 7A is a back view of the grip 8 when it is viewed from the back line position BL1 (from the direction of 270°), and FIG. 7B shows minute projection regions extracted from the view in FIG. 7A.

Incidentally, blackened portions in FIGS. 4A to 7A are portions where bland names, logos, etc. are marked.

As well shown in FIGS. 4B to 7B, the outer surface 12 of the cylindrical portion 10 includes minute projection regions 40. The minute projection regions 40 are arranged in the first region R1. The minute projection regions 40 are arranged in the second region R2. The minute projection regions 40 are arranged in the third region R3. No minute projection region 40 is disposed on the tip end 20 side with respect to the first region R1. Further, in the first region R1, no minute projection region 40 is provided in a region whose distance in the axial direction from the grip butt end 35 is less than or equal to 20 mm. Still further, no minute projection region 40 is provided at a position 130 mm away from the grip butt end 35. Note that it goes without saying that a minute projection region 40 may be disposed on the tip end 20 side with respect to the first region R1.

The enlarged portion of FIG. 4B is an enlarged view of the minute projection region 40. Each minute projection region 40 includes a plurality of first narrow grooves G1. The first narrow grooves G1 extend in a first direction. This first direction is not limited. Further, the minute projection region 40 includes second narrow grooves G2. The second narrow grooves G2 extend in a second direction. This second direction is not limited, as long as it is different from the first direction. In the present embodiment, the second direction is perpendicular to the first direction.

The minute projection region 40 includes a plurality of minute projections P1. Each minute projection P1 has a maximum width W1 and a minimum width W2. The maximum width W1 and the minimum width W2 are widths when viewed in a plan view. In the present embodiment, the minute projection P1 is square when viewed in the plan view. The maximum width W1, therefore, is the length of a diagonal line of the square, and the minimum width W2 is the length of one side of the square. The shape of the minute projection P1 when viewed in the plan view is not limited. For example, the minute projection P1 when viewed in the plan view may be circular, and in this case, the maximum width W1 is equal to the minimum width W2. With a view to suppressing chipping of the minute projection P1, the maximum width of the minute projection P1 is preferably greater than or equal to 0.2 mm, more preferably greater than or equal to 0.3 mm, and further preferably greater than or equal to 0.4 mm. From the viewpoint of anti-slippage performance, the maximum width W1 of the minute projection P1 is preferably less than or equal to 1.2 mm, more preferably less than or equal to 1.1 mm, and further preferably less than or equal to 1.0 mm.

The first narrow grooves G1 are arranged at uniform intervals. In the present embodiment, this uniform interval is the length of one side of the square. The second narrow grooves G2 are arranged at uniform intervals. In the present embodiment, the interval of the second narrow grooves G2 is equal to the interval of the first narrow grooves G1. In the present embodiment, the minute projections P1 are islands that remain as a result of intersections of the first narrow grooves G1 and the second narrow grooves G2. The minute projections P1 do not necessarily have to be such islands.

In the minute projection regions 40, an occupation ratio of the narrow grooves G1 and G2 per 25 $mm^2$ is preferably greater than or equal to 10% and less than or equal to 50%. The provision of "per 25 $mm^2$" is intended to set a unit area for specifying the occupation ratio of the narrow grooves.

Each narrow groove G1 has a width d1 of preferably greater than or equal to 0.05 mm and less than or equal to 0.7 mm, and more preferably greater than or equal to 0.05 mm and less than or equal to 0.5 mm. Each narrow groove G2 has a width d2 of preferably greater than or equal to 0.05 mm and less than or equal to 0.7 mm, and more preferably greater than or equal to 0.05 mm and less than or equal to 0.5 mm. The narrow groove G1 has a depth of preferably greater than or equal to 0.1 mm and less than or equal to 1.0 mm, and more preferably greater than or equal to 0.2 mm and less than or equal to 0.9 mm. The narrow groove G2 has a depth of preferably greater than or equal to 0.1 mm and less than or equal to 1.0 mm, and more preferably greater than or equal to 0.2 mm and less than or equal to 0.9 mm.

In the minute projection region 40, the minute projections P1 are arrayed. Each interval t1 of the minute projections P1 is preferably greater than or equal to 0.05 mm and less than or equal to 0.7 mm, and more preferably greater than or equal to 0.05 mm and less than or equal to 0.5 mm. The interval t1 is the minimum interval between the minute projections P1. In the present embodiment, this interval t1 is equal to the widths d1 and d2. The minute projections P1 have a height of preferably greater than or equal to 0.1 mm and less than or equal to 1.0 mm, and more preferably greater than or equal to 0.2 mm and less than or equal to 0.9 mm. In the present embodiment, the height of the minute projections P1 is equal to the depth of the narrow grooves G1 and G2.

In the minute projection regions 40, the number of the minute projections P1 per 25 $mm^2$ is preferably greater than or equal to 10, more preferably greater than or equal to 15, and further preferably greater than or equal to 20. The number of the minute projections P1 per 25 $mm^2$ is preferably less than or equal to 40, more preferably less than or equal to 35, and further preferably less than or equal to 30. The provision of "per 25 $mm^2$" is intended to set a unit area for specifying the density of the minute projections P1.

As mentioned above, the outer surface 12 of the cylindrical portion 10 can be divided into the front side S1 and the back side S2. As is clear from comparison between FIG. 4B and FIG. 7B, in the first region R1, the occupation ratio of the minute projection regions 40 on the front side S1 is greater than the occupation ratio of the minute projection regions 40 on the back side S2. Further, in the first region R1, the area of the minute projection regions 40 on the front side S1 is greater than the area of the minute projection regions 40 on the back side S2. The "occupation ratio" means a ratio of an area of minute projection regions 40 present in a target region for calculation to the whole area of the target region.

As is clear from comparison between FIG. 4B and FIG. 7B, in the second region R2, the occupation ratio of the minute projection regions 40 on the front side S1 is greater than the occupation ratio of the minute projection regions 40 on the back side S2. Further, in the second region R2, the area of the minute projection regions 40 on the front side S1 is greater than the area of the minute projection regions 40 on the back side S2.

As is clear from comparison between FIG. 4B and FIG. 7B, in the third region R3, the occupation ratio of the minute projection regions 40 on the front side S1 is greater than the occupation ratio of the minute projection regions 40 on the back side S2. Further, in the third region R3, the area of the minute projection regions 40 on the front side S1 is greater than the area of the minute projection regions 40 on the back side S2.

As shown in FIGS. 4B, 5B, and 6B, the area of the minute projection regions 40 in the third region R3 is greater than the area of the minute projection regions 40 in the second region R2.

As shown in FIG. 7B, the minute projection regions 40 have a small area on the back side S2. Particularly in the vicinity of the back line 22, the area of the minute projection regions 40 is small.

As shown in FIG. 7B, in the first region R1, a MP-reduced region 42 having a smaller occupation ratio of the minute projection regions 40 is provided on the back side S2. In the present embodiment, a circumferential range (245° to 295°) is the MP-reduced region 42. In the present embodiment, a circumferential range (235° to 305°) is the MP-reduced region 42. In the present embodiment, a circumferential range (225° to 315°) is the MP-reduced region 42. The occupation ratio of the minute projection regions 40 in the MP-reduced region 42 is preferably less than or equal to 10%, more preferably less than or equal to 5%, and further preferably 0%. In the grip 8, the occupation ratio of the minute projection regions 40 in the MP-reduced region 42 is 0%.

As shown in FIG. 7A, longitudinal grooves 44 are provided on the surface of the back line 22. In the MP-reduced region 42, the longitudinal grooves 44 are provided.

In the vicinity of the back line 22, the occupation ratio of land regions is great. The "land region" is a region where no recessed portion is provided. In the land region, there is no minute projection region, no groove, etc. In the first region R1, the occupation ratio of the land regions in the circumferential range (245° to 295°) is greater than or equal to 80%, or greater than or equal to 90%. In the circumferential range (245° to 295°), the longitudinal grooves 44 are provided. The occupation ratio of the land regions in the circumferential range (245° to 295°) is less than 100%.

As is clear from comparison between FIG. 5B and FIG. 7B, in the first region R1, the occupation ratio of the minute projection regions 40 in the circumferential range (90° to 270°) is greater than the occupation ratio of the minute projection regions 40 on the back side S2. In the first region R1, the area of the minute projection regions 40 in the circumferential range (90° to 270°) is greater than the area of the minute projection regions 40 on the back side S2. In the second region R2, the occupation ratio of the minute projection regions 40 in the circumferential range (90° to 270°) is greater than the occupation ratio of the minute projection regions 40 on the back side S2. In the second region R2, the area of the minute projection regions 40 in the circumferential range (90° to 270°) is greater than the area of the minute projection regions 40 on the back side S2. In the third region R3, the occupation ratio of the minute projection regions 40 in the circumferential range (90° to 270°) is greater than the occupation ratio of the minute projection regions 40 on the back side S2. In the third region R3, the area of the minute projection regions 40 in the circumferential range (90° to 270°) is greater than the area of the minute projection regions 40 on the back side S2.

As is clear from comparison between FIG. 5B and FIG. 7B, in the first region R1, the occupation ratio of the minute projection regions 40 in the circumferential range (135° to 225°) is greater than the occupation ratio of the minute projection regions 40 in the circumferential range (225° to 315°). In the first region R1, the area of the minute projection regions 40 in the circumferential range (135° to 225°) is greater than the area of the minute projection regions 40 in the circumferential range (225° to 315°). In the second region R2, the occupation ratio of the minute projection regions 40 in the circumferential range (135° to 225°) is greater than the occupation ratio of the minute projection regions 40 in the circumferential range (225° to 315°). In the second region R2, the area of the minute projection regions 40 in the circumferential range (135° to 225°) is greater than the area of the minute projection regions 40 in the circumferential range (225° to 315°). In the third region R3, the occupation ratio of the minute projection regions 40 in the circumferential range (135° to 225°) is greater than the occupation ratio of the minute projection regions 40 in the circumferential range (225° to 315°). In the third region R3, the area of the minute projection regions 40 in the circumferential range (135° to 225°) is greater than the area of the minute projection regions 40 in the circumferential range (225° to 315°).

As is clear from comparison between FIG. 6B and FIG. 7B, in the first region R1, the occupation ratio of the minute projection regions 40 in the circumferential range (270° to 90°) is greater than the occupation ratio of the minute projection regions 40 on the back side S2. In the first region R1, the area of the minute projection regions 40 in the circumferential range (270° to 90°) is greater than the area of the minute projection regions 40 on the back side S2. In the second region R2, the occupation ratio of the minute projection regions 40 in the circumferential range (270° to 90°) is greater than the occupation ratio of the minute projection regions 40 on the back side S2. In the second region R2, the area of the minute projection regions 40 in the circumferential range (270° to 90°) is greater than the area of the minute projection regions 40 on the back side S2. In the third region R3, the occupation ratio of the minute projection regions 40 in the circumferential range (270° to 90°) is greater than the occupation ratio of the minute projection regions 40 on the back side S2. In the third region R3, the area of the minute projection regions 40 in the circumferential range (270° to 90°) is greater than the area of the minute projection regions 40 on the back side S2.

Note that the "circumferential range (270° to 90°)" means a region extending clockwise from the circumferential position of 270° to the circumferential position of 90°. The circumferential range (270° to 90°) is a region having an angle range of 180 degrees having the circumferential position of 360° (0°) as the center of this angle range; i.e., the region of the left half circumference in FIG. 3. In this way, in the present application, the "circumferential range (θ1° to θ2°)" means a region extending clockwise from the circumferential position of θ1° to the circumferential position of θ2°. In other words, the circumferential range is defined clockwise.

As is clear from comparison between FIG. 6B and FIG. 7B, in the first region R1, the occupation ratio of the minute projection regions 40 in the circumferential range (315° to 45°) is greater than the occupation ratio of the minute projection regions 40 in the circumferential range (225° to 315°). In the first region R1, the area of the minute projection regions 40 in the circumferential range (315° to 45°) is greater than the area of the minute projection regions 40 in the circumferential range (225° to 315°). In the second region R2, the occupation ratio of the minute projection regions 40 in the circumferential range (315° to 45°) is greater than the occupation ratio of the minute projection regions 40 in the circumferential range (225° to 315°). In the second region R2, the area of the minute projection regions 40 in the circumferential range (315° to 45°) is greater than the area of the minute projection regions 40 in the circumferential range (225° to 315°). In the third region R3, the occupation ratio of the minute projection regions 40 in the circumferential range (315° to 45°) is greater than the occupation ratio of the minute projection regions 40 in the circumferential range (225° to 315°). In the third region R3, the area of the minute projection regions 40 in the circumferential range (315° to 45°) is greater than the area of the minute projection regions 40 in the circumferential range (225° to 315°).

As is clear from FIG. 7B, in the first region R1, the occupation ratio of the minute projection regions 40 in the circumferential range (180° to 225°) is greater than the occupation ratio of the minute projection regions 40 in the circumferential range (225° to 270°). In the first region R1, the area of the minute projection regions 40 in the circumferential range (180° to 225°) is greater than the area of the minute projection regions 40 in the circumferential range (225° to 270°). In the second region R2, the occupation ratio of the minute projection regions 40 in the circumferential range (180° to 225°) is greater than the occupation ratio of the minute projection regions 40 in the circumferential range (225° to 270°). In the second region R2, the area of the minute projection regions 40 in the circumferential range (180° to 225°) is greater than the area of the minute projection regions 40 in the circumferential range (225° to 270°). In the third region R3, the occupation ratio of the minute projection regions 40 in the circumferential range (180° to 225°) is greater than the occupation ratio of the minute projection regions 40 in the circumferential range (225° to 270°). In the third region R3, the area of the minute projection regions 40 in the circumferential range (180° to 225°) is greater than the area of the minute projection regions 40 in the circumferential range (225° to 270°).

As is clear from FIG. 7B, in the first region R1, the occupation ratio of the minute projection regions 40 in the circumferential range (315° to 360°) is greater than the occupation ratio of the minute projection regions 40 in the circumferential range (270° to 315°). In the first region R1, the area of the minute projection regions 40 in the circumferential range (315° to 360°) is greater than the area of the minute projection regions 40 in the circumferential range (270° to 315°). In the second region R2, the occupation ratio of the minute projection regions 40 in the circumferential range (315° to 360°) is greater than the occupation ratio of the minute projection regions 40 in the circumferential range (270° to 315°). In the second region R2, the area of the minute projection regions 40 in the circumferential range (315° to 360°) is greater than the area of the minute projection regions 40 in the circumferential range (270° to 315°). In the third region R3, the occupation ratio of the minute projection regions 40 in the circumferential range (315° to 360°) is greater than the occupation ratio of the minute projection regions 40 in the circumferential range (270° to 315°). In the third region R3, the area of the minute projection regions 40 in the circumferential range (315° to 360°) is greater than the area of the minute projection regions 40 in the circumferential range (270° to 315°).

A bidirectional arrow R50 in FIG. 4A indicates a region from the grip butt end 35 up to 50 mm therefrom. "50 mm" described herein indicates a distance in the axial direction. Regarding the grip 8, the weight the region R50, i.e., from the grip butt end 35 up to 50 mm therefrom, is referred to by "Wb". In the grip 8, the weight Wb is greater than or equal to 10 g. Further, in the grip 8, the weight Wb accounts for greater than or equal to 39% of a grip weight Wg.

A bidirectional arrow E1 in FIG. 2 indicates a thickness of the end cap portion 30. The thickness E1 of the end cap portion 30 is measured along the axial direction. In the grip 8, the thickness E1 is greater than or equal to 7 mm.

Effect

This grip 8 achieves the following advantageous effects.

Regarding the grip 8, the weight proportion of the region R50, i.e., from the grip butt end 35 up to 50 mm therefrom, is high. This weight distribution makes it easier to allow the wrist cock to be maintained, thereby causing the head speed and the swing speed to increase. When the swing speed increases, the centrifugal force exerted to the club increases. Further, when the acceleration of the club increases, the pressing force exerted from the hands to the grip increases as well. As a result of these, the grip that is being gripped is apt to become wobble. Besides, the grip 8 nearly falls out from hands during swing.

The minute projection regions 40 increase the friction force between the grip 8 and hands, and therefore can suppress the wobble of the grip 8. On the other hand, the minute projection regions 40 provided could lead to a decrease in abrasion resistance. However, arranging the minute projection regions 40 in an appropriately limited region suppresses the decrease in the abrasion resistance, thereby improving the durability.

It has been found that the region gripped by hands of a golfer is substantially the first region R1. Further, it has been found that, in a case of a right-handed golfer, the second region R2 is the region gripped by the left hand, and the first region R1 is the region gripped by the right hand. It has been found that, in a case of a left-handed golfer, the second region R2 is the region gripped by the right hand, and the first region R1 is the region gripped by the left hand. The following description is made with reference to an exemplary case of a right-handed golfer; in a case of a left-handed golfer, however, the same effects are achieved, only with the right hand and the left hand being replaced.

In the grip 8, in the first region R1, the occupation ratio of the minute projection regions 40 on the front side S1 is greater than the occupation ratio of the minute projection regions 40 on the back side S2. Further, in the first region R1, the area of the minute projection regions 40 on the front side S1 is greater than the area of the minute projection regions 40 on the back side S2. These relationships are also established in the second region R2 and the third region R3.

It has been found that a high anti-slippage property can be achieved even if the minute projection regions 40 are reduced on the back side S2. The back line 22 is a projection portion, and its circumferential position correlates with the orientation of the face in the club. By fixing the position of the back line 22 in the hands, the orientation of the face is stabilized. As the back line 22 is a projected portion, a high pressing force from the hands is applied to the back line 22. It has been found that the anti-slippage property can still be achieved even if no minute projection regions 40 are provided on the back line 22. Further, it has been found that if the minute projection regions 40 are provided on the back line 22, it is likely that cracks would be formed when rubber deteriorates. Still further, it has been found that if the minute projection regions 40 are provided on the back line 22, it is likely that forces in the circumferential direction are concentrated, thereby causing abrasion and/or peeling to occur. It has been found that the longitudinal grooves 44 (see FIG. 7A) provided on the back side S2 allow a sufficient anti-slippage property to be achieved. Arranging fewer minute projection region 40 on the back side S2 makes it possible to take advantage of the back line 22 while reducing regions where the minute projection regions 40 are provided, which makes it possible to enhance the grip stability, the anti-slippage property, and the durability. The "grip stability" means a property of causing the wobble of the grip to be suppressed, thereby stabilizing the grip in the hands. An increase in the grip stability leads to an increase in the probability of good shots.

In the grip 8, the area of the minute projection regions 40 in the third region R3 is greater than the area of the minute projection regions 40 in the second region R2.

It has been found that a sufficient anti-slippage property can be achieved even if the minute projection regions 40 are reduced in the second region R2. It is considered that this is because the left hand is pressed by the right hand when a golfer grips the grip 8. In other words, it is considered that this is because the left hand is in a state of being less slippery as compared with the right hand. Besides, normally, the left hand wears a glove, but the right hand does not wear a glove. This point has also proved that there is room for reduction of the minute projection regions 40 in the second region R2, i.e., a region for the left hand. Arranging fewer minute projection region 40 in the second region R2 makes it possible to reduce areas where the minute projection regions 40 are provided, which makes it possible to enhance the anti-slippage property and the durability.

Therefore, in the first region R1, a MP-reduced region 42 that has no minute projection region 40 can be provided on the back side S2. In other words, as described above, the circumferential range (245° to 295°) can be the MP-reduced region 42. Or alternatively, the circumferential range (235° to 305°) can be the MP-reduced region 42. Still alternatively, the circumferential range (225° to 315°) can be the MP-reduced region 42.

In a finger, a portion between the first joint and the second joint is also referred to as the middle phalanx. It has been found that by providing the minute projection regions 40 on portions that are to be in contact with the middle phalanxes of the respective fingers and the palms of the left hand and the right hand, the anti-slippage property is effectively enhanced. From this viewpoint, it has been found that it is effective to reduce the minute projection regions 40 in the vicinity of the back line 22, while arranging the minute projection regions 40 on the left side surface (on the 0° side) and the right side surface (on the 180° side) of the grip 8, in the first region R1. Therefore, in the grip 8, in the first region R1, the occupation ratio of the minute projection regions 40 in the circumferential range (90° to 270°) is set to be greater than the occupation ratio of the minute projection regions 40 on the back side S2. Further, in the first region R1, the area of the minute projection regions 40 in the circumferential range (90° to 270°) is greater than the area of the minute projection regions 40 on the back side S2. This relationship is also established in the second region R2 and the third region R3. With these configurations, it is possible to enhance the anti-slippage property and the durability, while reducing the minute projection regions 40 in the vicinity of the back line 22.

With a view to reducing the minute projection regions 40 on the back line 22 while arranging the minute projection regions 40 on the right and left side surfaces, the occupation ratio of the minute projection regions 40 in the circumferential range (135° to 225°) is greater than the occupation ratio of the minute projection regions 40 in the circumferential range (225° to 315°) in the first region R1. In the first region R1, the area of the minute projection regions 40 in the circumferential range (135° to 225°) is greater than the area of the minute projection regions 40 in the circumferential range (225° to 315°). This relationship is also established in the second region R2 and the third region R3. Further, in the first region R1, the occupation ratio of the minute projection regions 40 in the circumferential range (270° to 90°) is greater than the occupation ratio of the minute projection regions 40 on the back side S2. In the first region R1, the area of the minute projection regions 40 in the circumferential range (270° to 90°) is greater than the area of the minute projection regions 40 on the back side S2. This relationship is also established in the second region R2 and the third region R3. With these configurations, it is possible to enhance the anti-slippage property and the durability, while reducing the minute projection regions 40 in the vicinity of the back line 22.

With a view to reducing the minute projection regions 40 on the back line 22 while arranging the minute projection regions 40 on the right and left side surfaces, the occupation ratio of the minute projection regions 40 in the circumferential range (315° to 45°) is greater than the occupation ratio of the minute projection regions 40 in the circumferential range (225° to 315°) in the first region R1. In the first region R1, the area of the minute projection regions 40 in the circumferential range (315° to 45°) is greater than the area of the minute projection regions 40 in the circumferential range (225° to 315°). This relationship is also established in the second region R2 and the third region R3. With these configurations, it is possible to enhance the anti-slippage property and the durability, while reducing the minute projection regions 40 in the vicinity of the back line 22.

With a view to reducing the minute projection regions 40 on the back line 22 while arranging the minute projection regions 40 on the right and left side surfaces, the occupation ratio of the minute projection regions 40 in the circumferential range (180° to 225°) is greater than the occupation ratio of the minute projection regions 40 in the circumferential range (225° to 270°) in the first region R1. In the first region R1, the area of the minute projection regions 40 in the circumferential range (180° to 225°) is greater than the area of the minute projection regions 40 in the circumferential range (225° to 270°). This relationship is also established in the second region R2 and the third region R3. With these configurations, it is possible to enhance the anti-slippage property and the durability, while reducing the minute projection regions 40 in the vicinity of the back line 22.

With a view to reducing the minute projection regions 40 on the back line 22 while arranging the minute projection regions 40 on the right and left side surfaces, the occupation ratio of the minute projection regions 40 in the circumferential range (315° to 360°) is greater than the occupation ratio of the minute projection regions 40 in the circumferential range (270° to 315°) in the first region R1. In the first region R1, the area of the minute projection regions 40 in the circumferential range (315° to 360°) is greater than the area of the minute projection regions 40 in the circumferential range (270° to 315°). This relationship is also established in the second region R2 and the third region R3. With these configurations, it is possible to enhance the anti-slippage property and the durability, while reducing the minute projection regions 40 in the vicinity of the back line 22.

With a view to arranging the minute projection regions 40 on portions that are to be in contact with the middle phalanxes and the palms, the occupation ratio of the minute projection regions 40 on the back side S2 in the first region R1 is preferably greater than or equal to 3%, more preferably greater than or equal to 5%, further preferably greater than or equal to 7%, and still further preferably greater than or equal to 10%. With a view to reducing the minute projection regions 40 in the vicinity of the back line 22 and enhancing the grip stability and the durability, the occupation ratio of the minute projection regions 40 on the back side S2 in the first region R1 is preferably less than or equal to 30%, and more preferably less than or equal to 25%.

The thumbs and tip end portions of the respective fingers are to be in contact on the front side S1. By providing the minute projection regions 40 on the portions that are to be in contact with the fingers, the anti-slippage property and the grip stability are effectively enhanced. From this viewpoint, the occupation ratio of the minute projection regions 40 on the front side S1 in the first region R1 is preferably greater than or equal to 15%, more preferably greater than or equal to 20%, and further preferably greater than or equal to 25%. From the viewpoint of the abrasion resistance, the occupation ratio of the minute projection regions 40 on the front side S1 in the first region R1 is preferably less than or equal to 60%, and more preferably less than or equal to 55%.

The occupation ratio of the minute projection regions 40 on the front side S1 in the first region R1 is denoted by "M1". The occupation ratio of the minute projection regions 40 on the back side S2 in the first region R1 is denoted by "M2". With a view to enhancing the anti-slippage property, the grip stability, and the durability while enhancing the abrasion resistance, M1/M2 is preferably in the following range. As to the lower limit value of the range, M1/M2 is preferably greater than or equal to 2, more preferably greater than or equal to 3, and further preferably greater than or equal to 4. As to the upper limit value of the range, M1/M2 is preferably less than or equal to 10, more preferably less than or equal to 9, and further preferably less than or equal to 8.

By providing the minute projection regions 40 on the portions that are to be in contact with the phalanxes of the index to little fingers, the palm, and the thumb of the left hand, the anti-slippage property and the grip stability are enhanced. From this viewpoint, the occupation ratio of the minute projection regions 40 on the front side S1 in the second region R2 is preferably greater than or equal to 10%, more preferably greater than or equal to 20%, and further preferably greater than or equal to 25%. From the viewpoint of the abrasion resistance, the occupation ratio of the minute projection regions 40 on the front side S1 in the second region R2 is preferably less than or equal to 60%, and more preferably less than or equal to 55%.

The occupation ratio of the minute projection regions 40 on the front side S1 in the second region R2 is denoted by "M3". The occupation ratio of the minute projection regions 40 on the back side S2 in the second region R2 is denoted by "M4". With a view to enhancing the anti-slippage property, the grip stability, and the durability while enhancing the abrasion resistance, M3/M4 is preferably in the following range. As to the lower limit value of the range, M3/M4 is preferably greater than or equal to 2, more preferably greater than or equal to 3, and further preferably greater than or equal to 4. As to the upper limit value of the range, M3/M4 is preferably less than or equal to 10, more preferably less than or equal to 9, and further preferably less than or equal to 8.

By providing the minute projection regions 40 on the portions that are to be in contact with the phalanxes of the index to little fingers, the palm, and the thumb of the right hand, the anti-slippage property and the grip stability are enhanced. From this viewpoint, the occupation ratio of the minute projection regions 40 on the front side S1 in the third region R3 is preferably greater than or equal to 30%, more preferably greater than or equal to 40%, and further preferably greater than or equal to 45%. From the viewpoint of the abrasion resistance, the occupation ratio of the minute projection regions 40 on the front side S1 in the third region R3 is preferably less than or equal to 80%, and more preferably less than or equal to 70%.

The occupation ratio of the minute projection regions 40 on the front side S1 in the third region R3 is denoted by "M5". The occupation ratio of the minute projection regions 40 on the back side S2 in the third region R3 is denoted by "M6". With a view to enhancing the anti-slippage property, the grip stability, and the durability while enhancing the abrasion resistance, M5/M6 is preferably in the following range. As to the lower limit value of the range, M5/M6 is preferably greater than or equal to 2, more preferably greater than or equal to 3, and further preferably greater than or equal to 4. As to the upper limit value of the range, M5/M6 is preferably less than or equal to 10, more preferably less than or equal to 9, and further preferably less than or equal to 8.

In the grip 8, the thickness E1 of the end cap portion 30 is greater than or equal to 7 mm. By increasing the thickness E1, the proportion of weight assigned to the region from the grip butt end 35 up to 50 mm therefrom is increased.

The increase in the thickness E1 causes the weight of the end cap portion 30 to increase, thereby facilitating the deformation of the end cap portion 30. This allows the end cap portion 30 to function as a dynamic vibration absorber. This end cap portion 30 enhances the vibration absorption property, thereby reducing unpleasant vibration transmitted to the hands, and enhancing feel at impact.

Figure 8:
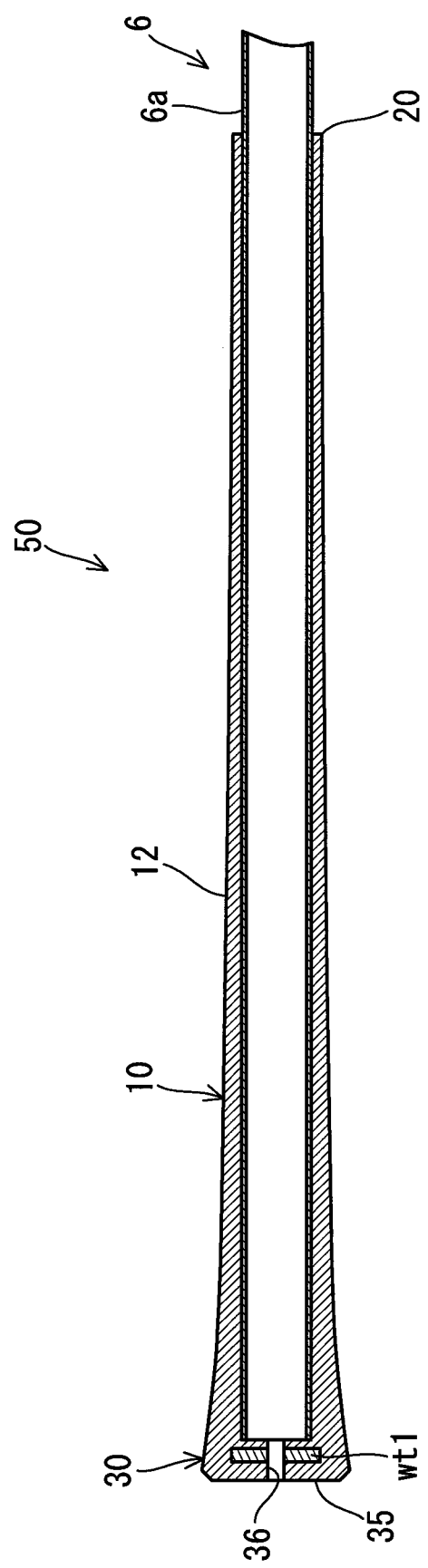

FIG. 8 is a cross-sectional view of a golf club in which a grip 50 according to a second embodiment is attached. This grip 50 includes a metal weight member wt1. The metal weight member wt1 increases the weight in a region from the grip butt end 35 up to 50 mm therefrom. Further, the metal weight member wt1 enhances the function of the end cap portion 30 as a dynamic vibration absorber, thereby improving the vibration absorption property.

With a view to increasing the weight Wb, and from the viewpoint of the vibration absorption property, the thickness E1 of the end cap portion 30 is preferably greater than or equal to 7 mm, and more preferably greater than or equal to 8 mm. With a view to preventing the grip weight Wg from becoming excessively great, the thickness E1 of the end cap portion 30 is preferably less than or equal to 15 mm, more preferably less than or equal to 13 mm, and further preferably less than or equal to 11 mm.

With a view to making it easier to allow the wrist cock to be maintained so as to increase the head speed, the weight Wb from the grip butt end up to 50 mm therefrom is preferably greater than or equal to 10 g, more preferably greater than or equal to 11 g, and further preferably greater than or equal to 12 g. With a view to preventing the grip weight Wg from becoming excessively great, the weight Wb is preferably less than or equal to 30 g, more preferably less than or equal to 25 g, and further preferably less than or equal to 20 g.

As described above, the metal weight member wt1 may be provided. With a view to making it easier to allow the wrist cock to be maintained so as to increase the head speed, the weight of the metal weight member wt1 is preferably greater than or equal to 5 g, more preferably greater than or equal to 7 g, and further preferably greater than or equal to 9 g. With a view to preventing the grip weight Wg from becoming excessively great, the weight of the metal weight member wt1 is preferably less than or equal to 25 g, more preferably less than or equal to 20 g, and further preferably less than or equal to 15 g.

With a view to making it easier to allow the wrist cock to be maintained so as to increase the head speed, the ratio of the weight Wb to the grip weight Wg is preferably greater than or equal to 39%, more preferably greater than or equal to 40%, and further preferably greater than or equal to 41%. With the preferable range of the weight Wb taken into consideration, the ratio of the weight Wb to the grip weight Wg is preferably less than or equal to 50%, more preferably less than or equal to 49%, and further preferably less than or equal to 48%.

A bidirectional arrow Le in FIG. 1 indicates a distance in the axial direction from the grip butt end 35 to the center of gravity CG of the grip. The ratio of the distance Le to a grip length Lg is hereinafter referred to as "grip gravity center ratio". With a view to making it easier to allow the wrist cock to be maintained so as to increase the head speed, the grip gravity center ratio is preferably less than or equal to 37%, more preferably less than or equal to 36%, and further preferably less than or equal to 35%. With the preferable range of the weight Wb taken into consideration, the grip gravity center ratio is preferably greater than or equal to 20%, more preferably greater than or equal to 25%, and further preferably greater than or equal to 30%.

Lightweight grips tend to have poor abrasion resistance. The above-described effects are therefore further effective in lightweight grips. From this viewpoint, the weight Wg of the grip is preferably less than or equal to 40 g, more preferably less than or equal to 38 g, and further preferably less than or equal to 35 g. With a view to distributing weight over the region from the grip butt end 35 up to 50 mm therefrom, the weight Wg of the grip is preferably greater than or equal to 25 g, more preferably greater than or equal to 28 g, and further preferably greater than or equal to 30 g.

A bidirectional arrow Lg in FIG. 1 indicates a length of the grip 8. The length Lg is a length from the grip butt end 35 to the tip end 20. The length Lg is measured along the axial direction. With a view to ensuring the first region R1 and a portion where a logo and the like is displayed, the length Lg is preferably greater than or equal to 230 mm, more preferably greater than or equal to 240 mm, and further preferably greater than or equal to 250 mm. With a view to decreasing the weight of the grip, the length Lg is preferably less than or equal to 290 mm, more preferably less than or equal to 280 mm, further preferably less than or equal to 270 mm, and still further preferably less than or equal to 265 mm.

The grip 8 may have a single-layer structure, or alternatively, a multilayer structure. With a view to distributing weight over the region from the grip butt end 35 up to 50 mm therefrom, the end cap portion 30 is preferably made of non-foam rubber. From the same viewpoint, the cylindrical portion 10 preferably includes a portion made of foamed rubber.

The material of the grip 8 is not limited. Examples of the material of the grip 8 include rubber compositions and resin compositions. Examples of the rubber composition include natural rubber (NR), ethylene propylene diene rubber (EPDM), styrene butadiene rubber (SBR), isoprene rubber (IR), butadiene rubber (BR), chloroprene rubber (CR), and acrylonitrile butadiene rubber (NBR). In particular, natural rubber, or natural rubber blended with ethylene propylene diene rubber or styrene butadiene rubber having excellent affinity for natural rubber, is preferable.

Oil may be mixed in the rubber composition. As this oil, for example, an aromatic oil, a naphthenic oil, a paraffinic oil, or the like can be used. In a case where sulfur crosslinking is made, sulfur is mixed. In the rubber composition for the grip, for example, a reinforcer, a filler, a vulcanization accelerator, a vulcanization aid, and the like may be mixed appropriately as required. Further, an aging inhibitor, a processing aid, and the like may be mixed.

As the material of the grip, a resin composition can be used as well. Examples of resin contained in this resin composition include thermoplastic resin. The thermoplastic resin can be used in injection forming. This thermoplastic resin is preferably thermoplastic elastomer, and more preferably thermoplastic elastomer containing soft segments and hard segments. With a view to achieving both of the desired grip property and the abrasion resistance, urethane-based thermoplastic elastomer is further preferable.

In a case where the rubber composition is a foam rubber, a foaming agent can be mixed. One example of this foaming agent is a thermally decomposable foaming agent. Examples of this thermally decomposable foaming agent include azo compounds such as azodicarbonamide, nitroso compounds such as dinitrosopentamethylene tetramine, and triazole compounds.

The method for producing the grip 8 is not limited. The grip 8 can be produced by a known producing method. Examples of the producing method include press-forming and injection forming.

As the press-forming, for example, a method of having the following steps can be used: setting a pre-formed material that is to be formed into the end cap portion 30 and a sheet material that is to be formed into the cylindrical portion 10 in a mold; closing the mold; and heating and pressing the mold. By causing the metal weight member wt1 to be wrapped in the pre-formed material that is to be formed into the end cap portion 30, the end cap portion 30 in which the metal weight member wt1 is embedded can be formed.

EXAMPLES

Example 1

The same grip as that of the first embodiment described above was produced. In the minute projection regions, the maximum width W1 of the minute projections P1 was set to 1.0 mm, and the interval t1 (the width d1, d2 of the narrow grooves) between the minute projections P1 was set to 0.2 mm. The shaft insertion hole 18 was formed with use of a mandrel. To form the back line, a mandrel having a flat portion in a part thereof in the circumferential direction was used. This mandrel and a material were set in a grip mold having an upper mold part and a lower mold part, and press-forming was carried out, whereby a grip having a back line was obtained. Further, this grip was attached to a butt end portion of a 40 g shaft, and a head was attached to a tip end portion of the shaft, whereby a club (driver) illustrated in FIG. 1 was obtained. The specification and evaluation results of Example 1 are shown in Table 1 below.

Note that, in Table 1, the "occupation ratio A1" refers to the occupation ratio of the minute projection regions in the circumferential range from 180° to 225° in the first region R1. Further, the "occupation ratio A2" refers to the occupation ratio of the minute projection regions in the circumferential range from 225° to 270° in the first region R1. Further, the "occupation ratio B1" refers to the occupation ratio of the minute projection regions in the circumferential range from 315° to 360° in the first region R1. Further, the "occupation ratio B2" refers to the occupation ratio of the minute projection regions in the circumferential range from 270° to 315° in the first region R1. Further, the "occupation ratio C" refers to the occupation ratio of the minute projection regions in the circumferential range from 245° to 295° in the first region R1.

Examples 2, 3 and Comparative Examples 1 to 3

Grips and golf clubs according to Examples 2 and 3, and Comparative Examples 1 to 3 were obtained in the same manner as that of Example 1 except for the specifications shown in Table 1 below.

Evaluation was carried out in the following way.
<Vibration Absorption Property>
Ten right-handed testers with a handicap of 10 to 20 carried out actual-shot tests, with a glove attached only to the left hand. Each tester shot five golf balls with each club, and sensory evaluation was performed on a rating scale using "A" and "B" regarding the vibration absorption property. The rating "A" is higher evaluation than the rating "B". Ratings as the evaluation results marked by the greater number of the testers are shown in Table 1 below.

<Head Speed>
The head speeds were measured in the actual-shot tests described above. Regarding each club, the mean value of fifty pieces of data is shown in Table 1 below.

<Grip Stability>
In the actual-shot tests described above, sensory evaluation was performed on a rating scale using "A", "B", and "C" regarding the grip stability. The rating "A" indicates the highest evaluation, and the rating "C" indicates the lowest evaluation. Ratings as the evaluation results marked by the greatest number of the testers are shown in Table 1 below.

<Abrasion Resistance>
After the above-described actual-shot tests were finished, the above-described testers further shot fifty balls with each club. As a result, 550 balls were shot by each club. Thereafter, the surface of each grip was observed so that the state of abrasion was determined, and the abrasion resistance was evaluated on a rating scale using "A", "B", and "C". The rating "A" indicates the highest evaluation, and the rating "C" indicates the lowest evaluation. The evaluation results are shown in Table 1 below.

TABLE 1

Specifications and Evaluation Results of Examples and Comparative Examples

|  | Unit | Ex. 1 | Ex. 2 | Ex. 3 | Comp. Ex. 1 | Comp. Ex. 2 | Comp. Ex. 3 |
|---|---|---|---|---|---|---|---|
| Grip length Lg | mm | 262 | 262 | 265 | 262 | 269 | 265 |
| Grip weight Wg | g | 30.9 | 30.5 | 37.4 | 31.1 | 45.7 | 27.4 |
| Weight Wb of portion from grip butt end to 50 mm therefrom | g | 12.7 | 12.7 | 17.9 | 12.7 | 17.4 | 9.1 |
| Weight of metal weight member | g | — | — | 10 | — | — | — |
| Ratio of Wb to Wg | % | 41 | 42 | 48 | 41 | 38 | 33 |
| Position of grip gravity center (distance from grip butt end) | mm | 92 | 92 | 84 | 92 | 94 | 108 |
| Grip gravity center ratio | % | 35 | 35 | 32 | 35 | 35 | 41 |
| Thickness E1 of end cap portion | mm | 8 | 8 | 8 | 8 | 5 | 5 |
| Range where minute projection regions exist (in axial direction) | mm | 20 to 200 | 20 to 200 | 20 to 200 | 20 to 200 | — | — |
| Occupation ratio of minute projection regions on front side S1 in second region R2 | % | 25 | 30 | 25 | 90 | — | — |
| Occupation ratio of minute projection regions on front side S1 in third region R3 | % | 46 | 30 | 46 | 90 | — | — |
| Occupation ratio of minute projection regions on back side S2 in second region R2 | % | 5 | 0 | 5 | 90 | — | — |
| Occupation ratio of minute projection regions on back side S2 in third region R3 | % | 19 | 0 | 19 | 90 | — | — |
| Occupation ratio A1 (180° to 225°) | % | 14 | 0 | 14 | 90 | — | — |
| Occupation ratio A2 (225° to 270°) | % | 0 | 0 | 0 | 90 | — | — |

TABLE 1-continued

Specifications and Evaluation Results of Examples and Comparative Examples

| | Unit | Ex. 1 | Ex. 2 | Ex. 3 | Comp. Ex. 1 | Comp. Ex. 2 | Comp. Ex. 3 |
|---|---|---|---|---|---|---|---|
| Occupation ratio B1 (315° to 360°) | % | 7 | 0 | 7 | 90 | — | — |
| Occupation ratio B2 (270° to 315°) | % | 0 | 0 | 0 | 90 | — | — |
| Occupation ratio C (245° to 295°) | % | 0 | 0 | 0 | 90 | — | — |
| Vibration absorption property | — | A | A | A | A | B | B |
| Head speed | m/s | 41 | 40 | 42 | 41 | 37 | 38 |
| Grip stability | — | A | A | A | B | C | C |
| Abrasion resistance | — | A | A | A | C | A | A |

As shown in Table 1, the evaluation results of Examples are higher than the evaluation results of Comparative Examples.

The following clauses are disclosed regarding the above-described embodiments.

[Clause 1]

A grip for a golf club, the grip including a cylindrical portion into which a shaft is inserted, and an end cap portion, wherein the cylindrical portion, on its outer surface, includes a minute projection region where a plurality of minute projections each of which has a maximum width of greater than or equal to 0.2 mm and less than or equal to 1.2 mm are arranged at intervals of greater than or equal to 0.05 mm and less than or equal to 0.7 mm, the minute projection region is disposed in a first region whose distance in an axial direction from a grip butt end is from 0 mm to 210 mm, and of the grip, a portion from the grip butt end up to 50 mm therefrom has a weight of greater than or equal to 10 g, the weight accounting for greater than or equal to 39% of a whole weight of the grip.

[Clause 2]

The grip according to clause 1, wherein, the outer surface of the cylindrical portion is divided into a front side and a back side in a circumferential direction, and an occupation ratio of the minute projection region on the front side is greater than an occupation ratio of the minute projection region on the back side in the first region.

[Clause 3]

The grip according to clause 1 or 2, wherein the cylindrical portion includes a back line.

[Clause 4]

The grip according to any one of clauses 1 to 3, wherein, the first region is divided into a second region and a third region, the second region having a distance in the axial direction from the grip butt end that is from 0 mm to 130 mm, and the third region having a distance in the axial direction from the grip butt end that is from 130 mm to 210 mm, and an area of the minute projection region in the third region is greater than an area of the minute projection region in the second region.

[Clause 5]

The grip according to any one of clauses 1 to 4, wherein, a circumferential position of front of the grip is given as 90°, and a circumferential range is determined as a range extending clockwise when viewed from a grip butt end side, in the first region, an occupation ratio of the minute projection region in a circumferential range extending from 180° to 225° is greater than an occupation ratio of the minute projection region in a circumferential range extending from 225° to 270°, and in the first region, an occupation ratio of the minute projection region in a circumferential range extending from 315° to 360° is greater than an occupation ratio of the minute projection region in a circumferential range extending from 270° to 315°.

[Clause 6]

The grip according to clause 5, wherein, in the first region, an occupation ratio of the minute projection region in a circumferential range extending from 245° to 295° is less than or equal to 10%.

[Clause 7]

The grip according to any one of clauses 1 to 6, wherein the end cap portion has a thickness of greater than or equal to 7 mm.

[Clause 8]

The grip according to any one of clauses 1 to 7, wherein a metal weight member having a specific gravity of greater than or equal to 7 is embedded in the end cap portion.

The foregoing description describes only examples, and various changes can be made without departing from the scope and sprit of the present disclosure.

What is claimed is:

1. A grip for a golf club, the grip comprising:
a cylindrical portion into which a shaft is inserted; and
an end cap portion,
wherein the cylindrical portion, on its outer surface, includes a minute projection region where a plurality of minute projections each of which has a maximum width of greater than or equal to 0.2 mm and less than or equal to 1.2 mm are arranged at intervals of greater than or equal to 0.05 mm and less than or equal to 0.7 mm,
the minute projection region is disposed in a first region whose distance in an axial direction from a grip butt end is from 0 mm to 210 mm, and
of the grip, a portion from the grip butt end up to 50 mm therefrom has a weight of greater than or equal to 10 g and less than or equal to 30 g, the weight accounting for greater than or equal to 39% and less than or equal to 50% of a whole weight of the grip.

2. The grip according to claim 1, wherein, the outer surface of the cylindrical portion is divided into a front side and a back side in a circumferential direction, and an occupation ratio of the minute projection region on the front side is greater than an occupation ratio of the minute projection region on the back side in the first region.

3. The grip according to claim 2, wherein, an occupation ratio of the minute projection region on the front side in the first region is denoted by M1, an occupation ratio of the minute projection region on the back side in the first region is denoted by M2, and M1/M2 is greater than or equal to 2 and less than or equal to 10.

4. The grip according to claim 3, wherein the occupation ratio of the minute projection region on the front side in the first region is greater than or equal to 15% and less than or equal to 60%.

5. The grip according to claim 1, wherein the cylindrical portion includes a back line.

6. The grip according to claim 5, wherein, a circumferential position of front of the grip is given as 90°, and a circumferential range is determined as a range extending clockwise when viewed from a grip butt end side, and
in the first region, an occupation ratio of the minute projection region in a circumferential range extending from 245° to 295° is less than or equal to 10%.

7. The grip according to claim 6, wherein, in the first region, an occupation ratio of the minute projection region in the circumferential range extending from 245° to 295° is 0%.

8. The grip according to claim 5, wherein, a circumferential position of front of the grip is given as 90°, and a circumferential range is determined as a range extending clockwise when viewed from a grip butt end side, and
in the first region, an occupation ratio of the minute projection region in a circumferential range extending from 90° to 270° is greater than an occupation ratio of the minute projection region on the back side, and an occupation ratio of the minute projection region in a circumferential range extending from 270° to 90° is greater than an occupation ratio of the minute projection region on the back side.

9. The grip according to claim 6, wherein a land region having no recessed portion is provided in the first region, and
in the first region, an occupation ratio of the land region in the circumferential range extending from 245° to 295° is greater than or equal to 80% and less than 100%.

10. The grip according to claim 1, wherein, the first region is divided into a second region and a third region, the second region having a distance in the axial direction from the grip butt end that is from 0 mm to 130 mm, and the third region having a distance in the axial direction from the grip butt end that is from 130 mm to 210 mm, and an area of the minute projection region in the third region is greater than an area of the minute projection region in the second region.

11. The grip according to claim 1, wherein,
a circumferential position of front of the grip is given as 90°, and a circumferential range is determined as a range extending clockwise when viewed from a grip butt end side,
in the first region, an occupation ratio of the minute projection region in a circumferential range extending from 180° to 225° is greater than an occupation ratio of the minute projection region in a circumferential range extending from 225° to 270°, and
in the first region, an occupation ratio of the minute projection region in a circumferential range extending from 315° to 360° is greater than an occupation ratio of the minute projection region in a circumferential range extending from 270° to 315°.

12. The grip according to claim 11, wherein, in the first region, an occupation ratio of the minute projection region in a circumferential range extending from 245° to 295° is less than or equal to 10%.

13. The grip according to claim 1, wherein the end cap portion has a thickness of greater than or equal to 7 mm.

14. The grip according to claim 1, wherein a metal weight member having a specific gravity of greater than or equal to 7 is embedded in the end cap portion.

15. The grip according to claim 1, wherein the cylindrical portion and the end cap portion are unitarily formed and are not connected to a separate and distinct weight.

16. The grip according to claim 15, wherein the cylindrical portion and end cap portion are formed of the same material.

17. The grip according to claim 1, wherein the portion from the grip butt end up to 50 mm therefrom has a weight of greater than or equal to 10 g and less than or equal to 20 g.

18. The grip according to claim 1, wherein the outer surface of the cylindrical portion is divided into a front side and a back side in a circumferential direction, and an occupation ratio of the minute projection region on the front side in the first region is greater than or equal to 15% and less than or equal to 60%.

19. A grip for a golf club, the grip consisting of:
a cylindrical portion into which a shaft is inserted; and
an end cap portion, the cylindrical portion and the end cap portion being unitarily formed of the same material,
wherein the cylindrical portion, on its outer surface, includes a minute projection region where a plurality of minute projections each of which has a maximum width of greater than or equal to 0.2 mm and less than or equal to 1.2 mm are arranged at intervals of greater than or equal to 0.05 mm and less than or equal to 0.7 mm,
the minute projection region is disposed in a first region whose distance in an axial direction from a grip butt end is from 0 mm to 210 mm, and
of the grip, a portion from the grip butt end up to 50 mm therefrom has a weight of greater than or equal to 10 g, the weight accounting for greater than or equal to 39% of a whole weight of the grip.

20. A grip for a golf club, the grip comprising:
a cylindrical portion into which a shaft is inserted; and
an end cap portion,
wherein the cylindrical portion, on its outer surface, includes a minute projection region where a plurality of minute projections each of which has a maximum width of greater than or equal to 0.2 mm and less than or equal to 1.2 mm are arranged at intervals of greater than or equal to 0.05 mm and less than or equal to 0.7 mm,
the minute projection region is disposed in a first region whose distance in an axial direction from a grip butt end is from 0 mm to 210 mm, and
of the grip, a portion from the grip butt end up to 50 mm therefrom has a weight of greater than or equal to 10 g, the weight accounting for greater than or equal to 39% of a whole weight of the grip,
wherein the outer surface of the cylindrical portion is divided into a front side and a back side in a circumferential direction, and an occupation ratio of the minute projection region on the front side is greater than an occupation ratio of the minute projection region on the back side in the first region, an occupation ratio of the minute projection region on the front side in the first region is denoted by M1, an occupation ratio of the minute projection region on the back side in the first region is denoted by M2, and M1/M2 is greater than or equal to 2 and less than or equal to 10, and wherein the occupation ratio of the minute projection region on the front side in the first region is greater than or equal to 15% and less than or equal to 60%.

\* \* \* \* \*